(12) United States Patent
Bong et al.

(10) Patent No.: US 11,607,874 B2
(45) Date of Patent: Mar. 21, 2023

(54) STEAM PEELING DEVICE FOR AUTOMOBILE TINTING FILM

(71) Applicants: Hyeon Ho Bong, Gwangju (KR); Hyeon U Bong, Gwangju (KR); Da Ae Bong, Gwangju (KR)

(72) Inventors: Hyeon Ho Bong, Gwangju (KR); Hyeon U Bong, Gwangju (KR); Da Ae Bong, Gwangju (KR)

(*) Notice: Subject to any disclaimer, the term of this patent is extended or adjusted under 35 U.S.C. 154(b) by 0 days.

(21) Appl. No.: 17/564,520

(22) Filed: Dec. 29, 2021

(65) Prior Publication Data

US 2022/0347999 A1 Nov. 3, 2022

Related U.S. Application Data

(63) Continuation of application No. PCT/KR2021/017098, filed on Nov. 19, 2021.

(30) Foreign Application Priority Data

Apr. 28, 2021 (KR) .................. 10-2021-0055051
Nov. 15, 2021 (KR) .................. 10-2021-0156970

(51) Int. Cl.
*B32B 43/00* (2006.01)
*B08B 7/00* (2006.01)
(Continued)

(52) U.S. Cl.
CPC .......... *B32B 43/006* (2013.01); *B08B 7/0071* (2013.01); *B08B 13/00* (2013.01);
(Continued)

(58) Field of Classification Search
CPC . B32B 43/006; B32B 2605/08; B08B 7/0064; B08B 7/0071; B08B 13/00;
(Continued)

(56) References Cited

U.S. PATENT DOCUMENTS

| 1,842,099 A | 1/1932 | Johnson |
| 2018/0037102 A1 | 2/2018 | Wade et al. |

FOREIGN PATENT DOCUMENTS

| JP | 2002-248947 A | 9/2002 |
| JP | 2004-083177 A | 3/2004 |

(Continued)

OTHER PUBLICATIONS

Wagner 915 On-demand Steamer Device, Device available Aug. 18, 2020, webpage available on Internet Archive. Viewed Sep. 26, 2022. Available at: http://web.archive.org/web/20200815022553/ https://www.wagnerspraytech.com/products/surface-prep-tools/915-on-demand-steamer/ (Year: 2020).*

(Continued)

*Primary Examiner* — Galen H Hauth
*Assistant Examiner* — Alexander S Wright
(74) *Attorney, Agent, or Firm* — Park & Associates IP Law Office (57) ABSTRACT

The embodiments disclosed are related to a steam peeling device for an automobile tinting film which includes: a wire frame banding module, a wire frame sleeve stainless pipe; a wire frame stent top plate; a pair of tapered slit fitting members; a U-shaped groove; a pair of gripping parts; a wire frame fixing groove; a cover plate; and a plurality of rivet holes. The steam peeling device of the present invention solves the problem of the conventional case that the wire frame banding is loosened during the steam peeling operation, the steam tarpaulin is separated, or a part of the steam is released, and thereby solves the trouble of resetting the wire frame banding during operation, thereby lowering the product unit cost through product productivity and function improvement, and reducing the time and labor costs further without resetting during operation along with the convenience of operation.

1 Claim, 5 Drawing Sheets

(51) Int. Cl.
    *B08B 13/00* (2006.01)
    *B29B 17/02* (2006.01)
(52) U.S. Cl.
    CPC ....... *B08B 2203/0264* (2013.01); *B29B 17/02* (2013.01); *B29B 2017/0255* (2013.01); *B32B 2605/08* (2013.01); *Y02W 30/62* (2015.05)
(58) Field of Classification Search
    CPC ............ B08B 2203/0264; B29B 17/02; B29B 2017/0255; Y02W 30/62; Y10S 160/03
    See application file for complete search history.

(56)          References Cited

FOREIGN PATENT DOCUMENTS

| JP | 2010-030317 A   | 2/2010 |
|----|-----------------|--------|
| KR | 10-19910002633 A | 2/1991 |
| KR | 20-0133376 Y1   | 2/1999 |
| KR | 10-0261049 B1   | 7/2000 |
| KR | 10-20040091884 A | 11/2004 |
| KR | 10-0494586 B1   | 6/2005 |
| KR | 10-0494590 B1   | 6/2005 |
| KR | 10-20050082141 A | 8/2005 |
| KR | 10-0862478 B1   | 10/2008 |
| KR | 10-2284573 B1   | 8/2021 |
| KR | 10-2335957 B1   | 12/2021 |

OTHER PUBLICATIONS

Korean Notice of Allowance (KR 10-2021-0055051), KIPO, dated Jul. 26, 2021.
Korean Notice of Allowance (KR 10-2021-0156970), KIPO, dated Nov. 29, 2021.
International Search Report (PCT/KR2021/017098), WIPO, dated Mar. 2, 2022.

* cited by examiner

STEAM PEELING DEVICE FOR AUTOMOBILE TINTING FILM

REFERENCE TO RELATED APPLICATIONS

This is a continuation of International Patent Application PCT/KR2021/017098 filed on Nov. 19, 2021, which designates the United States and claims priority of Korean Patent Application No. KR 10-2021-0055051 filed on Apr. 28, 2021, and Korean Patent Application No. 10-2021-0156970 filed on Nov. 15, 2021 the entire contents of which are incorporated herein by reference.

FIELD OF THE INVENTION

The embodiments discussed herein are related to a steam peeling device for an automobile tinting film, and more particularly, to a steam peeling device that facilitates a tinting film operation without damage to a heat ray when replacing a tinting film of an automobile.

BACKGROUND OF THE INVENTION

Generally, a vehicle tinting film is attached to a windshield glass, a rear glass, a door glass, and the like for the ultraviolet light shielding, energy saving, glass scattering prevention, heat blocking and personal privacy. However, in many cases, the vehicle tinting film may be scratched by long-term use, or may be discolored by excessive exposure to a direct sunlight, or need to be subjected to a re-tinting operation due to tinting bubbles.

The windshield glass or the door glass have no big difficulty during the automobile re-tinting operation as described above, but the operation of removing the tinting film is one of the esoteric tasks as follows. For example, when performing the re-operation because the heating ray is attached, even if skilled operators heat both faces of the tinting glass using a hand steamer or a heating gun to weaken the adhesive force of the tinting film, and then carefully peels it with an unifacial sword or a hand, a lot of time is required, and even the heating rays are often damaged and peeled, so it has a lot of burden that the entire rear glass must be replaced and compensated for loss.

The tinting film peeling method (https://youtu.be/4mCelqkKAhc) disclosed in a non-patent literature uses a general steam gun or a heating gun, but unlike a side face door glass, the rear glass involves the problem that it is difficult to secure an operation space in a narrow corner region, and partial heating or steam heating operation in an open state causes a risk of a heat ray being peeled off due to the heat or steam locally applied to the tinting film, it requires a skill level, and it takes a lot of time.

Conventionally, Korean Patent Registration No. 10-0494586 discloses a tinting film peeling device for peeling a tinting film from an automobile glass among systems that are installed and used in the dismantling line system of a discarded automobile, and recycling only automobile glass. According to this patent, the tinting film peeling device comprises a loading device that absorbs and moves the door glass from the discarded automobile with a pneumatic fixing unit, a fixing device of the door glass moved to the loading device, a steam spraying device on the door glass tinting film of the fixing device, and a tinting film removal device having a film cutting and scraper. Also, Korean Patent Registration No. 10-0494590 discloses a device which comprises a transfer device for moving a door glass coming out of a discarded automobile to a removal device, a fixing unit that fixes the moved door glass, a rotating unit that rotates the door glass, a spraying unit that sprays steam, high-temperature, high-pressure water, and air, and a chamber unit to which door glass is rotatably fixed.

The main purpose of using the above-mentioned device is to peel off the automobile glass attached with the tinting film separated from the automobile glass assembly separated from the discarded automobile, and to recycle the automobile glass. In terms of usage or tinting film peeling operation, it is limited to the peeling system installed and used in the dismantling line system of a discarded automobile. It can be seen that this is different from the tinting film peeling system in the state of being fixed to the automobile glass assembly inside a vehicle for replacing the deteriorated automobile tinting film.

In addition, Korean Patent Registration No. 10-0862478 discloses a film horizontal continuous rotation peeling device for the front and rear door glasses for discarded automobiles. Even in the case of such a peeling device, the main purpose as the device used in one process in the parts dismantling line of the discarded automobile is to recycle the tinting film-peeled the automobile glass separated from the automobile glass assembly separated from the discarded automobile, wherein its constituent units include: a feeding unit that collects and supplies the door glass to the rotating chamber; a transfer unit that transfers the door glass disposed in the feeding unit to the rotating chamber; a rotating chamber that removes the tinting film from the door glass; and an electric motor that rotates the rotating chamber, and it is removed by the solvent stored in the rotating chamber.

Moreover, Korean Unexamined Patent Publication No. 10-2005-0082141 discloses a glass double-sided film peeling device, which comprises a carry-in conveyor that carries in the glass attached with protective film in a horizontal position, a table that floats the stored glass, a carry-out means of the floating glass; a peeling support means for the edge of the peeled film between the carry-in conveyor and the table, a conveyor for carrying-out the peeled glass, a nozzle that blows air to the peeled film, a guide that guides the film in the press-fit state, and a film recovery box, and the like. It can be seen that this is a peeling device for plate face protection film attached to both sides of glass, and its purpose, usage and technical field are different from the film peeling device for automobile re-tinting operation.

In view of the problems of the prior art literatures as described above, the applicant's earlier registered Korean Patent No. 10-2284573 discloses a 'steam peeling device for an automobile tinting film', which is characterized by comprising: a steam tarpaulin in the form of a round bottom side ladder; a wire frame sleeve seam part in which the outer seam of the steam tarpaulin is rolled and sewn at regular intervals; a steam jack formed by fusion at the center of the steam tarpaulin $3/5$ height; a banding hole formed by inserting a cover cloth in the center of the upper wire frame sleeve seam part of the steam tarpaulin; a wire frame band having a certain length that is inserted so that band adjusting finials are fixed and cross-protrusively formed at both ends to the left and right of the banding hole inside the wire frame sleeve seam. Most of the problems encountered with the conventional case are solved by such a peeling device, so that it can be fitted and compatible with car glass assemblies of different shapes and sizes according to various automobile models, and the steam is applied evenly over the entire tinting surface, thereby easily peeling off the tinting film having weakened adhesive strength at on time. In addition, the operation time is shortened, no partial tearing occurs, and thus the usefulness according to shortening of the subsequent operation time is provided.

PRIOR ART LITERATURE

[Patent Literature 1] KR 10-0494586 (B1) 2005.06.01
[Patent Literature 2] KR 10-0494590 (B1) 2005.06.01
[Patent Literature 3] KR 10-0862478 (B1) 2008.10.01
[Patent Literature 4] KR 10-2005-0082141(A) 2005.08.22
[Patent Literature 5] KR 10-2284573 (B1) 2021.07.27
[Non-Patent Literature 1] https://youtu.be/4mCelqkKAhc.

SUMMARY OF THE INVENTION

Therefore, an objective of the present invention is to provide a steam peeling device for an automobile tinting film, that reduces the risk factor of the heat ray band being peeled off due to local heating by partial heating or steam exposure in an open state, which is a general problem with the conventional method of peeling an automobile tinting film using a steam gun or a heating gun, does not require a high degree of skill, particularly is easy to apply to the operation space in a narrow corner region such as windshield glass on the front and rear door glass, and peels off the tinting film with weakened adhesive force by the steam tarpaulin that covers the entire assembly compatible with automobile glass assemblies of various sizes and shapes according to vehicle models, rather than the operation of repeating partial heating and partial peeling. Based on the above, the main objective of the present invention is to eliminate the trouble of re-setting the wire frame banding during operation caused by the following problems of the applicant's earlier patents: the wire frame banding, which is embedded in the wire frame sleeve seam, which is the tarpaulin outer frame of the steam peeling device inserted into the frame of the automobile glass assembly, is partially loosened in the banding hole, which is the skin covering material, due to the ejection pressure of the steam, so that the steam tarpaulin is detached from the glass assembly rim and a part of the steam is released.

In order to achieve the above objective, according to the embodiments of the present invention, there is provided a steam peeling device for an automobile tinting film comprising: a steam tarpaulin 1 in the form of a rectangular oval; a wire frame sleeve seam part 2 in which an outer seam part of the steam tarpaulin is rolled, folded and sewn at regular intervals; and a steam jack 3 formed by fusion on one side of the middle of the steam tarpaulin; and a steam peeling device body 100 in which a wire frame band 4 having a certain length is inserted into the wire frame sleeve seam part 2, and a banding adjusting finial 4' formed at the end thereof are cross-pulled out to the upper edge slit 5 in the middle part of the welding end 2 of the steam tarpaulin wire frame sleeve seam part 2, the improvement of which includes:
a wire frame banding module 200 that is rivet assembled on both surfaces of the steam tarpaulin 1 in contact with a slit 5 in the middle part of the upper side border of the wire frame sleeve seam part 2, a wire frame sleeve stainless pipe 6 in which a banding hole 6' is cut and formed in the middle;
a wire frame banding top plate 7 having a length and a constant width standard of the wire frame sleeve stainless pipe 6, which is assembled in the front part of the steam tarpaulin of a portion where both ends of the wire frame band 4 intersect and protrude on both sides of the banding hole 6' of the wire frame sleeve stainless pipe 6 via the inside of the wire frame sleeve seam part 2;

a pair of tapered slit fitting members 8 that is integrally protruded and formed at the standard intervals of the banding holes 6' on both sides of the upper border of the wire frame banding top plate 7;
a U-shaped groove 9 that is formed in a back face border of the upper side end of the tapered slit fitting member 8 and a back face border on the lower side of the wire frame slit top plate 7;
a pair of gripping parts 10 that are formed to protrude at a predetermined interval to the right and left in the middle part of the front face of the wire frame banding top plate 7;
a wire frame fixing groove 11 that is formed in the vicinity of the wire frame banding top plate 7 inside the pair of gripping parts 10;
a cover plate 12 which is a rectangular member having a standard corresponding to the back face part of the wire frame banding top plate 7; and
a plurality of rivet holes 13 that are penetrated opposite to each other in the wire frame banding top plate 7 and the cover plate 12.

According to the present invention, a steam peeling device for an automobile tinting film is provided in which it is basically easy to apply to the operation space in a narrow corner region as in the automobile windshield glass and rear door glass, the tinting film having weakened adhesive force by the steam tarpaulin covering the entire windshield glass or rear glass assembly is peeled off at one time rather than the operation of repeating the partial peeling, it reduces the risk factor of heat ray being peeled off due to local heating caused by partial heating or steam exposure in an open state, it does require a high degree of skill. In addition, the present invention provides the effects of eliminating the trouble of re-setting the wire frame banding during operation caused by the following problems of the applicant's earlier patents: the wire frame band, which is embedded in the wire frame sleeve seam part, which is the tarpaulin outer frame of the steam peeling device inserted into the frame of the automobile glass assembly, is partially loosened in the banding hole, which is the skin covering material, due to the ejection pressure of the steam, so that the steam tarpaulin is detached from the glass assembly rim and a part of the steam is released. Thereby, the present invention provides the effect of reducing the product unit costs through more advanced product productivity and improved functions, providing the convenience of operation and further shortening the time and labor costs without resetting during operation, as compared with a conventional case.

DETAILED DESCRIPTION OF THE INVENTION

In order to achieve the above objective, preferred embodiments of the present invention will be described in detail with reference to the accompanying drawings as follows.

The steam peeling device for an automobile tinting film according to the present invention basically reduces a risk factor of a heat ray being peeled off due to local heating due to partial heating or steam exposure in an open state during the tinting film peeling operation, and does not require a high degree of skill.

In particular, the present steam peeling device is easy to apply to the operation space in a narrow corner region as in the windshield glass on the front and rear door glass, and peels off the windshield glass or the tinting film having weakened adhesive force by the steam tarpaulin covering the entire rear glass assembly at one time, rather than the operation of repeating the partial peeling. In addition, as a complementary task in the earlier registered patent literatures that is the basis of the present invention, the wire frame banding, which is embedded in the wire frame sleeve seam part, which is the tarpaulin outer frame of the steam peeling device inserted into the frame of the automobile glass assembly, is partially loosened in the banding hole, which is the skin covering material, due to the ejection pressure of the steam, so that the steam tarpaulin is detached from the glass assembly border and a part of the steam is released. Specific examples of the present invention are as follows.

Figure 1:
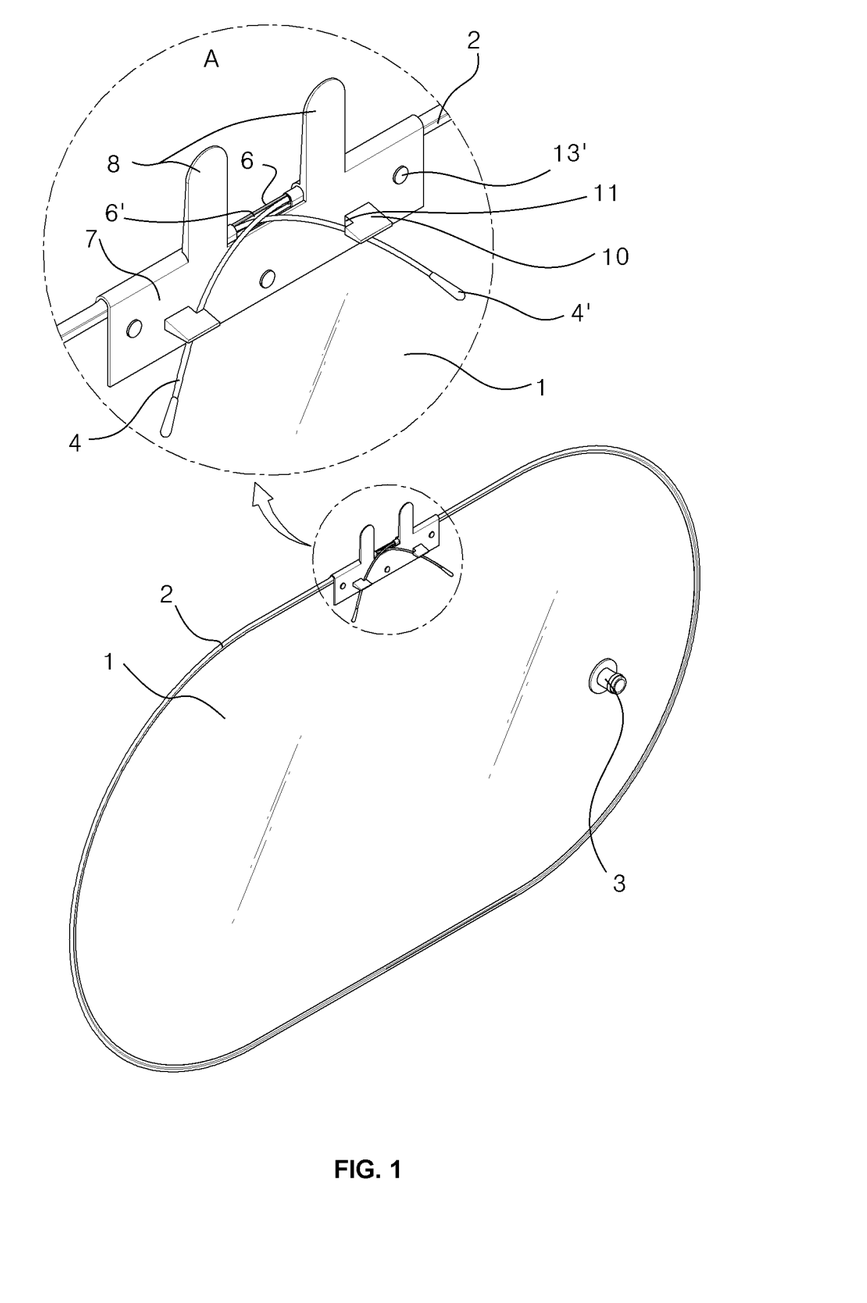
FIG. 1 is a perspective view of the main body of a tinting film steam peeling device according to the present invention and an enlarged reference view of an excerpt of the main part A.
Figure 2:
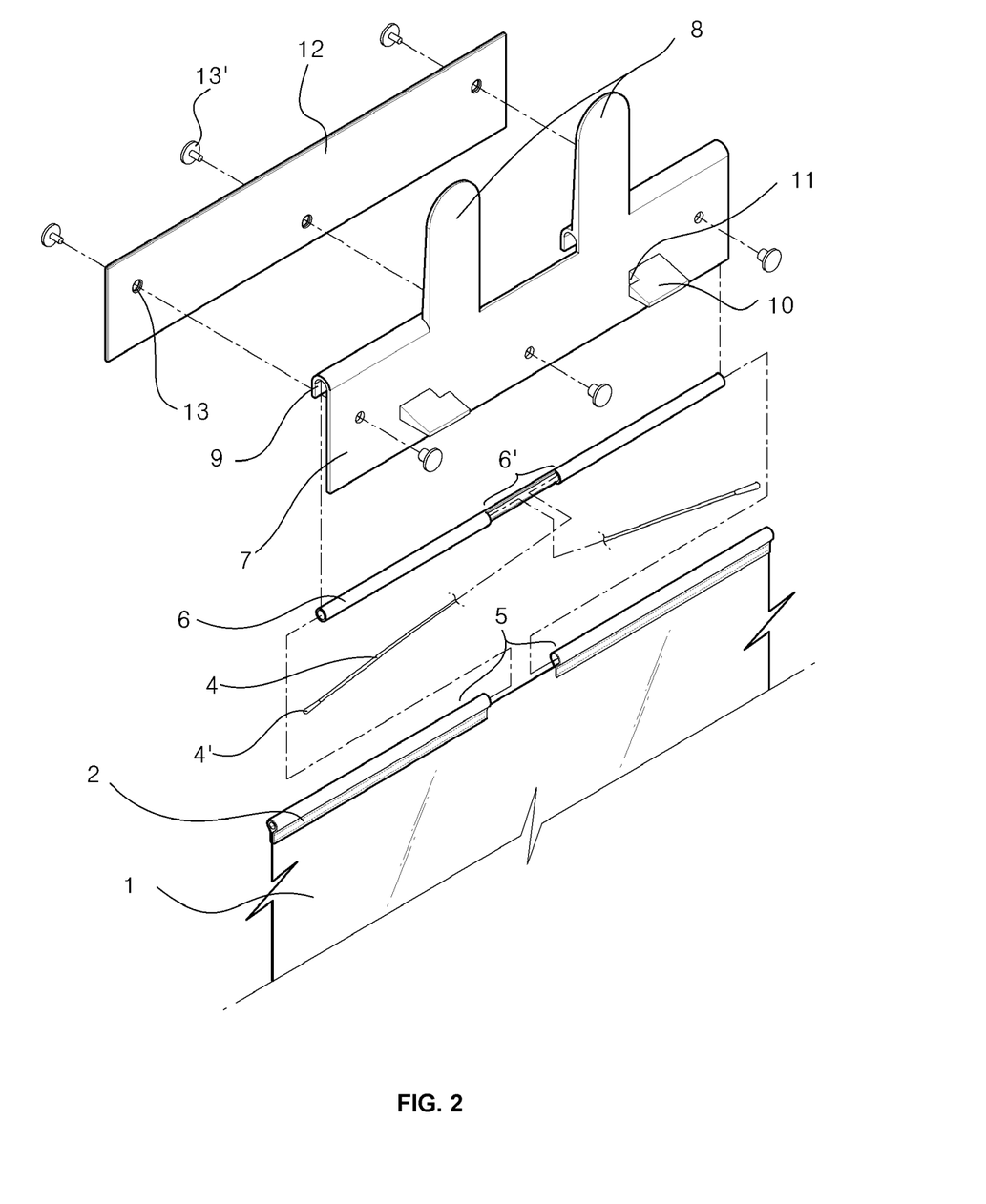
FIG. 2 is a perspective view of the excerpted disassembly and assembly of the wire frame banding module provided on the outer upper end of the steam tarpaulin, which is the main part of the present invention.
Figure 3:
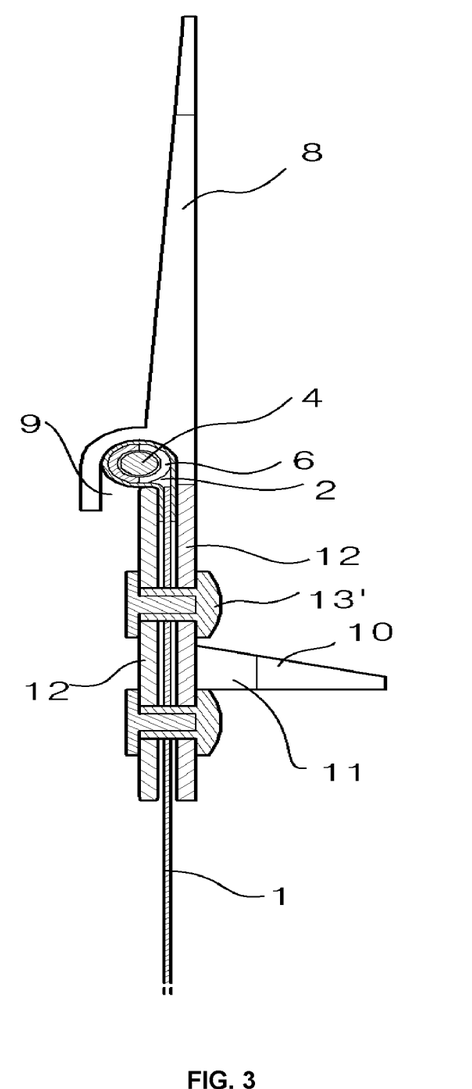
FIG. 3 is a partially excerpted cross-sectional view of the assembly state of the wire frame banding module, which is the main part of the present invention.

As shown in FIGS. 1, 2 and 3, the steam peeling device for an automobile tinting film according to the present invention includes: a steam tarpaulin 1 in the form of a rectangular oval; a wire frame sleeve seam part 2 in which an outer seam part of the steam tarpaulin is rolled, folded and sewn at regular intervals; and a steam jack 3 formed by fusion on one side of the middle of the steam tarpaulin; and a steam peeling device body 100 in which a wire frame band 4 having a certain length is inserted into the wire frame sleeve seam part 2, and a bending adjusting finial 4' formed at the end thereof are cross-pulled out to the upper edge slit 5 in the middle part of the welding end 2 of the steam tarpaulin wire frame sleeve seam part 2, the improvement of which includes:

a wire frame banding module 200 that is rivet assembled on both surfaces of the steam tarpaulin 1 in contact with a slit 5 in the middle part of the upper side border of the wire frame sleeve seam part 2, a wire frame sleeve stainless pipe 6 in which a banding hole 6' is cut and formed in the middle;

a wire frame banding top plate 7 having a length and a constant width standard of the wire frame sleeve stainless pipe 6, which is assembled in the front part of the steam tarpaulin of a portion where both ends of the wire frame band 4 intersect and protrude on both sides of the banding hole 6' of the wire frame sleeve stainless pipe 6 via the inside of the wire frame sleeve seam part 2;

a pair of tapered slit fitting members 8 that is integrally protruded and formed at the standard intervals of the banding holes 6' on both sides of the upper border of the wire frame banding top plate 7;

a U-shaped groove 9 that is formed in a back face border of the upper side end of the tapered slit fitting member 8 and a back face border on the lower side of the wire frame slit top plate 7;

a pair of gripping parts 10 that are formed to protrude at a predetermined interval to the right and left in the middle part of the front face of the wire frame banding top plate 7;

a wire frame fixing groove 11 that is formed in the vicinity of the wire frame banding top plate 7 inside the pair of gripping parts 10;

a cover plate 12 which is a rectangular member having a standard corresponding to the back face part of the wire frame banding top plate 7; and a plurality of rivet holes 13 that are penetrated opposite to each other in the wire frame banding top plate 7 and the cover plate 12.

The method applied to the steam peeling device body 100 of the wire frame banding module 200 is configured as shown in FIGS. 1, 2, 4 and 5. The wire frame banding module 200, that is rivet assembled on both surfaces of the steam tarpaulin 1 in contact with a slit 5 in the middle part of the upper side border of the wire frame sleeve seam part 2, is inserted by locating a banding hole 6' in which the middle of the wire frame sleeve stainless pipe 6 is cut and formed in the slit 5 in the middle part of the upper side border of the wire frame sleeve seam part 2 in the figure mark 'A'.

In the next assembling step, a wire frame band 4 having a certain length is inserted and cross-pulled out through the banding hole 6' in which the middle of the wire frame sleeve stainless pipe 6 is cut and formed, and then the both ends thereof are finally fixed with the banding adjusting finial 4'.

In the above, it is preferable that the wire frame band 4 is adopted as a wire spring stainless steel wire having a thickness of 1.5 to 2.5 mm and having a thickness that allows it to be freely inserted into the wire frame sleeve stainless pipe 6.

In the next assembling step, similar to the figure mark 'A' portion which is the area where the wire frame band 4 is cross-pulled out through the wire frame sleeve stainless pipe 6 in the slit 5 in the middle part of the front upper border of the steam tarpaulin 1 at the welding end of the wire frame sleeve 2 through the banding hole 6', the wire frame sleeve seam part 2 is pressed into the U-shaped groove 9 so that the slit 5 is exposed between the pair of tapered slit fitting members 8 formed on the wire frame banding top plate 7.

In the next assembling step, a cover plate 12, which is a rectangular member of the standard corresponding to the wire frame banding top plate 7, which is press-inserted to the upper border of the front face of the steam tarpaulin 1 of the wire frame sleeve seam part 2, is pressed and fixed to the portion corresponding to the wire frame banding top plate 7 on the back side of the steam tarpaulin 1 of the wire frame sleeve seam part 2 through the cover plate 12 and the several rivet holes 13 penetrated, thereby completing the assembly.

Figure 4:
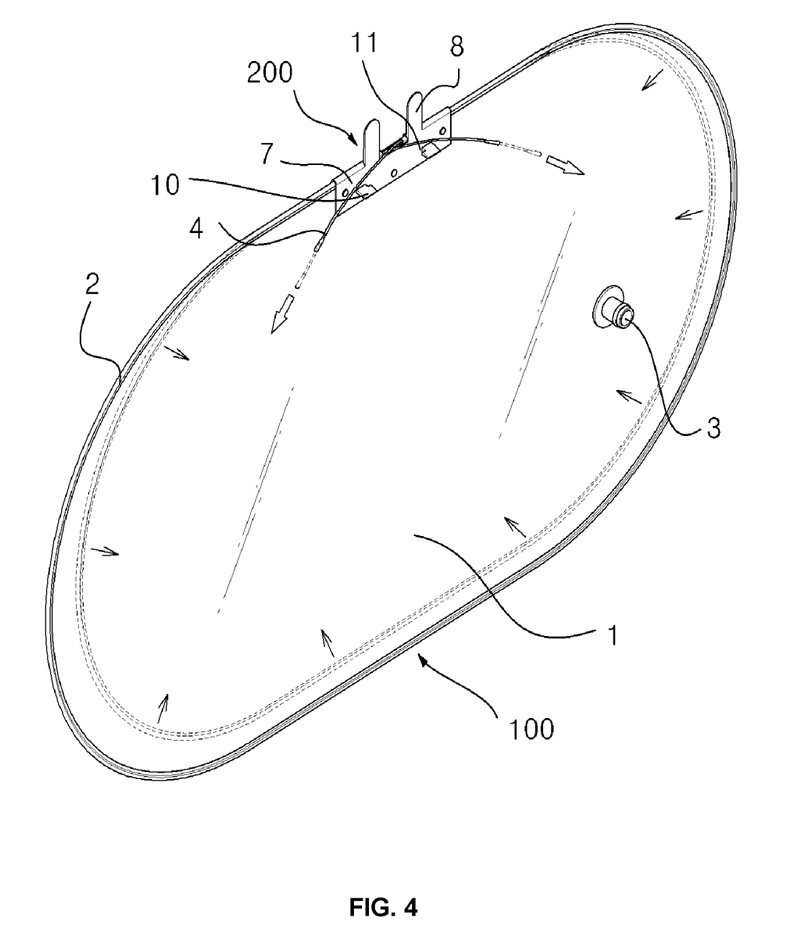
FIG. 4 is a reference perspective view showing a state in which the width of the steam tarpaulin is adjusted using the wire frame banding module, which is the main part of the present invention.
Figure 5:
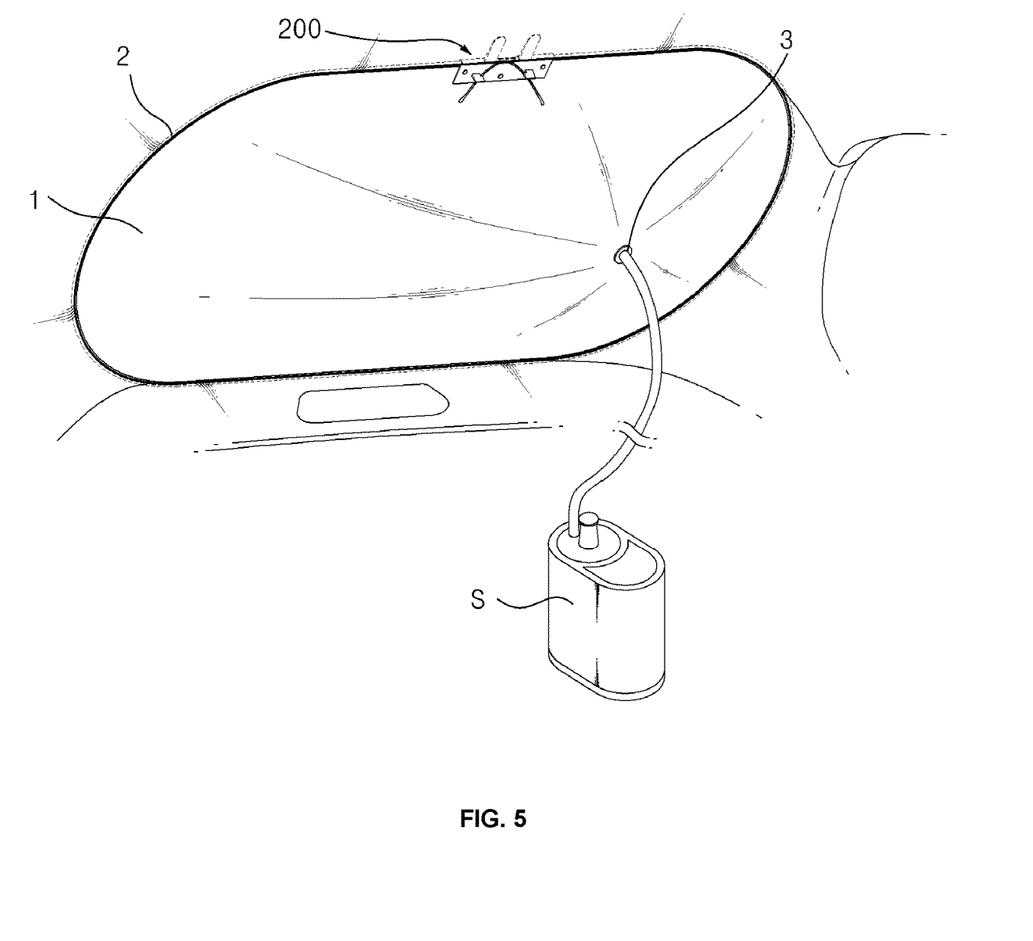
FIG. 5 is a reference perspective view of the usage state according to the present invention.

As described above, in order to examine the more improved effects and functions during steam peeling operation by the steam peeling device for an automobile tinting film with configuration assembly, the embodiments of the present invention will be described with reference to a reference perspective view showing the state in which the width of the steam tarpaulin is adjusted using the wire frame banding module 200, which is the main part of the present invention of FIG. 4, and a reference perspective view of the usage state according to the present invention.

The operation sequence according to the present invention is to primarily set by inserting a tapered slit fitting member 8 into the upper middle outer edge of the windshield glass or rear glass and the corner gap of the vehicle interior material using the gripping part 10 of the wire frame banding top plate 7 provided in the wire frame banding module 200, when the steam tarpaulin 1 of the steam peeling device is set to the operation position in the approximate width and area of the outer border of the windshield glass or rear glass of the vehicle model subject to steam peeling of the tinting film and the corner gap between the interior materials of the vehicle.

As for the next operation performance step, the width and area adjustment of the steam tarpaulin 1 set in an approximate width and area state is the wire frame sleeve in the middle part of the slit 5 of the front upper edge of the steam tarpaulin 1 of the wire frame clasp top plate 7, hold the wire frame banding 4 on both sides cross-pulled out with the banding hole 6' of the stainless pipe 6, push the wire frame sleeve as far as possible into the stainless pipe 6, and set the steam tarpaulin 1 to the maximum width and area. In such a state, in order to allow the shape to be not loosened due to pressure during steam injection, both ends of the wire frame banding 4 is elastically pinched, and it is firmly cross-fixed to the wire frame fixing groove 11 inside the pair of griping parts 10 formed on the wire frame banding top plate 7. When dismantling, the reverse process will be followed.

After completing the steam preparation setting operation in this way, in a state in which both ends of the wire frame banding 4 are elastically retracted, they are cross-fixed to the wire frame fixing groove 11 inside a pair of gripping parts 10 formed on the wire frame banding top plate 7, and maintained during operation, which resolves the biggest problem of the conventional case, for example, during the steam peeling operation of tinting film, the wire frame band embedded in the wire frame sleeve seam part, which is attached to the tarpaulin outer frame attached to the frame of the automobile glass assembly, is partially loosened in the banding hole, which is the skin covering material, due to the ejection pressure of the steam, so that the steam tarpaulin is detached from the border of the glass assembly or the steam is partially released. The present invention is to solve these problems, and to prevent the trouble of having to set the wire frame banding again during the operation.

As for the next steam operation, as shown in FIG. 5, the steam hose of the electric steamer S prepared is connected to the steam jack 3 of the steam tarpaulin 1, and blow out steam at 70 to 80° C. for 5 to 15 minutes depending on the adhesive state of the tinting film. Then, the electric steamer S and the steam tarpaulin 1 are removed, and the tinting film whose adhesive strength is weakened is to easily temporarily peel the entirety rather than partial peeling as in the conventional case.

The steam peeling device for an automobile tinting film according to the present invention as described above solves the problems of the earlier patent literatures that are the basis of the invention, and thus is a useful invention that reduces the unit cost of products through more advanced product productivity and enhancements, and reduces the time and labor costs without resetting during operation along with the convenience of operation.

REFERENCE NUMBER LIST

1: steam tarpaulin
2: wire frame sleeve seam part
3: steam jack
4: wireframe banding
4': banding adjusting finial
5: slit
6: wire frame sleeve stainless pipe
6': banding hole
7: wire frame banding top plate
8: tapered slit fitting member
9: U-shaped groove
10: gripping part
11: wire frame fixing groove
12: cover plate
13: rivet hole
13': rivet
S: electric steamer
100: steam peeling device body
200: wireframe banding module.

What is claimed is:

1. A steam peeling device for an automobile tinting film comprising:

a steam tarpaulin (1) in the form of a rectangular oval; a wire frame sleeve seam part (2) in which an outer seam part of the steam tarpaulin is rolled, folded and sewn at regular intervals; and a steam jack (3) formed by fusion on one side of the middle of the steam tarpaulin; and a steam peeling device body (100) in which a wire frame band (4) having a certain length is inserted into the wire frame sleeve seam part (2), and a banding adjusting finial (4') formed at the end thereof are cross-pulled out to the upper edge slit (5) in the middle part of a welded end of the steam tarpaulin wire frame sleeve seam part (2);

a wire frame banding module (200) that is rivet assembled on both surfaces of the steam tarpaulin (1) in contact with a slit (5) in the middle part of the upper side border of the wire frame sleeve seam part (2), a wire frame sleeve stainless pipe (6) in which a banding hole (6') is cut and formed in the middle;

a wire frame banding top plate (7) having a length and a constant width standard of the wire frame sleeve stainless pipe (6), which is assembled in the front part of the steam tarpaulin of a portion where both ends of the wire frame band (4) intersect and protrude on both sides of the banding hole (6') of the wire frame sleeve stainless pipe (6) via the inside of the wire frame sleeve seam part (2);

a pair of tapered slit fitting members (8) that is integrally protruded and formed at the standard intervals of the banding holes (6') on both sides of the upper border of the wire frame banding top plate (7);

a U-shaped groove (9) that is formed in a back face border of the upper side end of the tapered slit fitting member (8) and a back face border on the lower side of the wire frame slit top plate (7);

a pair of gripping parts (10) that are formed to protrude at a predetermined interval to the right and left in the middle part of the front face of the wire frame banding top plate (7);

a wire frame fixing groove (11) that is formed in the vicinity of the wire frame banding top plate (7) inside the pair of gripping parts (10);

a cover plate (12) which is a rectangular member having a standard corresponding to the back face part of the wire frame banding top plate (7); and a plurality of rivet holes (13) that are penetrated opposite to each other in the wire frame banding top plate (7) and the cover plate (12).

* * * * *